US012810373B2

(12) United States Patent
Dziezanowski et al.

(10) Patent No.: US 12,810,373 B2
(45) Date of Patent: Nov. 24, 2026

(54) STATE MANAGED ASYNCHRONOUS RUNTIME

(71) Applicant: OMRON Corporation, Kyoto (JP)

(72) Inventors: Joseph Dziezanowski, Salisbury, NH (US); Darren Jay Prevost, Merrimack, NH (US); Serge Limondin, Peterborough, NH (US)

(73) Assignee: OMRON Corporation, Kyoto (JP)

( * ) Notice: Subject to any disclaimer, the term of this patent is extended or adjusted under 35 U.S.C. 154(b) by 421 days.

(21) Appl. No.: 18/217,417

(22) Filed: Jun. 30, 2023

(65) Prior Publication Data

US 2025/0005702 A1 Jan. 2, 2025

(51) Int. Cl.

| | |
|---|---|
| ***G06T 1/20*** | (2006.01) |
| ***G06F 9/50*** | (2006.01) |
| ***G06K 7/14*** | (2006.01) |
| ***G06T 1/00*** | (2006.01) |

(52) U.S. Cl.
CPC .............. *G06T 1/20* (2013.01); *G06K 7/1413* (2013.01)

(58) Field of Classification Search
None
See application file for complete search history.

(56) References Cited

U.S. PATENT DOCUMENTS 7,756,757 B1 * 7/2010 Oakes, III .............. G06Q 30/02 705/26.1
2009/0064154 A1 * 3/2009 Aulbach ................ G16H 30/20 718/103
2009/0119553 A1 * 5/2009 Matsushima ...... H04N 1/32561 718/100
2012/0323605 A1 12/2012 Okuyama
2013/0335766 A1 12/2013 Ishiguro
(Continued)

FOREIGN PATENT DOCUMENTS

CN 104850403 A 8/2015
CN 110300240 * 10/2019 ............ H04M 1/725
(Continued)

OTHER PUBLICATIONS

Extended European Search Report dated Nov. 27, 2024, issued in corresponding European Patent Application No. 24180343.6.
Extended European Search Report dated Dec. 4, 2024, issued in corresponding European Patent Application No. 24185539.4.
Office Action issued in corresponding Japanese Patent Application No. 2024-096088, dated Jul. 29, 2025.
(Continued)

*Primary Examiner* — Beniyam Menberu
(74) *Attorney, Agent, or Firm* — Morgan, Lewis & Bockius LLP

(57) ABSTRACT

This application is directed to image processing. An electronic device identifies a plurality of image processing cycles associated with a temporal sequence of triggers, and each image processing cycle is created in response to one or more respective trigger events. The plurality of image processing cycles is to a plurality of parallel pipelines. For each parallel pipeline, the electronic device pulls a respective cycle data container from a cycle data pool. A first image processing cycle is processed in a first parallel pipeline to generate first report data, independently of processing remaining image processing cycles in respective remaining parallel pipelines. The first report data is reported to a client device coupled to the electronic device for further processing (e.g., storage, classification, analysis, and/or visualization).

20 Claims, 8 Drawing Sheets

(56) References Cited

U.S. PATENT DOCUMENTS

| | | | | |
|---|---|---|---|---|
| 2014/0181472 | A1* | 6/2014 | Krig | G06F 9/3867 712/201 |
| 2015/0016536 | A1* | 1/2015 | Hsieh | H04N 19/625 375/240.18 |
| 2015/0213838 | A1 | 7/2015 | Dinev et al. | |
| 2017/0034401 | A1 | 2/2017 | Shiohara | |
| 2017/0308324 | A1* | 10/2017 | Courville | G06F 3/0656 |
| 2017/0353397 | A1* | 12/2017 | Che | G06F 9/5088 |
| 2019/0213734 | A1 | 7/2019 | Leng et al. | |
| 2019/0303164 | A1* | 10/2019 | King | G06T 1/20 |
| 2021/0295002 | A1 | 9/2021 | Nagata et al. | |
| 2022/0114019 | A1 | 4/2022 | Sathe et al. | |
| 2022/0385529 | A1 | 12/2022 | Dang et al. | |
| 2023/0385102 | A1* | 11/2023 | Nandan | G06F 9/30189 |

FOREIGN PATENT DOCUMENTS

| | | | | |
|---|---|---|---|---|
| CN | 113286098 | A | 8/2021 | |
| CN | 113687946 | * | 11/2021 | G06F 9/50 |
| CN | 113742052 | * | 12/2021 | G06F 9/50 |
| JP | H11242750 | * | 9/1999 | G06T 1/20 |
| JP | 2004-070686 | A | 3/2004 | |
| JP | 2008-140042 | A | 6/2008 | |
| JP | 2008146503 | * | 6/2008 | G06F 9/50 |
| JP | 2018-005502 | A | 1/2018 | |
| WO | 2022/079517 | A1 | 4/2022 | |

OTHER PUBLICATIONS

Office Action issued in related U.S. Appl. No. 18/382,426, dated Oct. 21, 2025.

* cited by examiner

STATE MANAGED ASYNCHRONOUS RUNTIME

TECHNICAL FIELD

The disclosed embodiments relate generally to electronic circuits and more specifically to systems, devices, and methods for configuring hardware resources to process a plurality of image processing cycles in a plurality of parallel pipelines.

BACKGROUND

Computer processors implement parallelism, pipelining, overlap of software tasks, and dedicated hardware acceleration to enhance their processing capabilities. These processing enhancement techniques are often limited to highly repeatable cycles that functionally implement identical or similar jobs involving little or no change from cycle to cycle. The computer processors are configured using a register model, and consistently apply a single configuration to drive runtime execution. For example, a processor pipeline oftentimes has a fixed number of stages. Multiple stages are staggered, and a stage of a current cycle oftentimes runs concurrently with a distinct stage of a previous cycle. It would be beneficial to develop a parallel processing mechanism that is highly flexible and efficient while utilizing existing computer resources sufficiently.

SUMMARY

Various embodiments of this application are directed to a core high-performance runtime engine configured to process image data in parallel pipelines for heavy-duty industrial machine vision applications. The machine vision applications are applied in an electronic device (e.g., an imaging device including one or more cameras) to implement functions including, but not limited to, image processing, code reading, product information extraction, and print quality verification. Specifically, a state-managed asynchronous pipelined architecture is applied in the electronic device for image processing in these machine vision applications. Multiple image processing cycles are executed in parallel in a plurality of pipelines, exploiting hardware capabilities without bottlenecks. Each image processing cycle includes a plurality of time-critical stages and operations that are optionally triggered and staggered in a plurality of threads. In some embodiments, a trigger event is received while a previous image processing cycle is still in progress, and corresponds to a completely different image processing cycle assigned to a different pipeline that is implemented independently of the previous image processing cycle. In some prior art implementations, a stage of an image processing job uses available hardware capabilities, and may force any other image processing jobs or other stages of the same image processing job to wait in a queue. Conversely, in this application, the state-managed asynchronous pipelined architecture takes advantage of available hardware capabilities and results in an increase in performance by executing multiple image processing cycles in parallel pipelines independently of one another, and this performance increase scales linearly with the number of processor cores of an imaging device.

In one aspect, an image processing method is implemented at an electronic device (e.g., an imaging device) having memory and one or more processors. The method includes identifying a plurality of image processing cycles associated with a temporal sequence of triggers. Each image processing cycle is created in response to one or more respective trigger events. The method further includes assigning the plurality of image processing cycles to a plurality of parallel pipelines (e.g., each image processing cycle is assigned to a respective parallel pipeline) and, for each parallel pipeline, pulling a respective cycle data container from a cycle data pool. The method further includes processing a first image processing cycle in a first parallel pipeline to generate first report data, independently of processing remaining image processing cycles in respective remaining parallel pipelines. The method further includes providing the first report data to a client device, e.g., for further processing (such as storage, classification, analysis, and/or visualization).

In some embodiments, the cycle data pool includes a predefined number of cycle data containers prior to identifying the plurality of image processing cycles. Once assigned to a respective image processing cycle, each parallel pipeline directly uses one of the predefined number of cycle data containers without waiting for creation of a new cycle data container. In some situations, the predefined number of cycle data containers is fully used with different pipelines, and no cycle data container can be pulled for a new pipeline. In some embodiments, processing the first image processing cycle further includes populating a first cycle data container with image data associated with the one or more respective trigger events, generating first cycle data including the first report data, and storing the first cycle data in the first cycle data container.

In some embodiments, the imaging device is communicatively coupled to the client device (e.g., a laptop computer, a desktop computer, or a mobile phone) via a wired or wireless communication link. A user interface of the machine vision application is enabled on the client device to present report data collected from the imaging device in a user friendly manner. In some embodiments, the client device is located remotely from the imaging device, and coupled to the imaging device via a server. A web-based user interface is enabled on the client device to remotely review the report data that is reported by the imaging device by way of the server.

In accordance with some embodiments, an electronic device includes one or more processors, memory, and one or more programs stored in the memory. The programs are configured for execution by the one or more processors. The one or more programs include instructions for performing any of the methods described herein.

In accordance with some embodiments, a non-transitory computer-readable storage medium stores one or more programs configured for execution by an electronic device having one or more processors and memory. The one or more programs include instructions for performing any of the methods described herein.

Thus methods, systems, and devices are disclosed that enable optimal design, execution, and performance of barcode scanners.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the entire inventive subject matter.

Reference will now be made to embodiments, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF EMBODIMENTS

Various embodiments of this application are directed to a core high-performance runtime engine configured to process image data in parallel pipelines for heavy-duty industrial machine vision applications. A state-managed asynchronous pipelined architecture is applied in an electronic device (e.g., an imaging device) for image processing in these machine vision applications. Specifically, the electronic device identifies a plurality of image processing cycles associated with a temporal sequence of triggers, and each image processing cycle is created in response to one or more respective trigger events (e.g., acquisition of an image). The electronic device assigns the plurality of image processing cycles to a plurality of parallel pipelines. For each parallel pipeline, a pre-existing cycle data container is pulled from a cycle data pool. A first image processing cycle is processed in a first parallel pipeline to generate first report data, independently of remaining image processing cycles in respective remaining parallel pipelines. The first report data is provided to a client device. In some embodiments, each image processing cycle includes a plurality of time-critical operations and stages that are optionally triggered and staggered in a plurality of threads of a corresponding pipeline. Such a state-managed asynchronous pipelined architecture takes advantage of available hardware capabilities and results in a substantial increase in performance by executing multiple image processing cycles in parallel pipelines independently, and this performance increase scales linearly with a number of processor cores (e.g., CPUs, FPGAs, NPUs, and/or GPUs) of the electronic device.

The primary objective of the state-managed asynchronous pipelined architecture is to achieve maximum performance for an image processing system for full utilization of hardware resources including, but not limited to, processors, acquisition sources, input/output, communication channels, processing threads, and processes. Additionally, this architecture greatly simplifies user intervention to control, configure and monitor a runtime, thereby enhancing user experience. In some embodiments, the processing pipelines and associated hardware and software settings are altered at any time without creating a significant overhead. In some embodiments, self-analysis and tuning of the architecture is automatically enabled by deep instrumentation to improve image processing performance with no or little user interaction.

Figure 1:
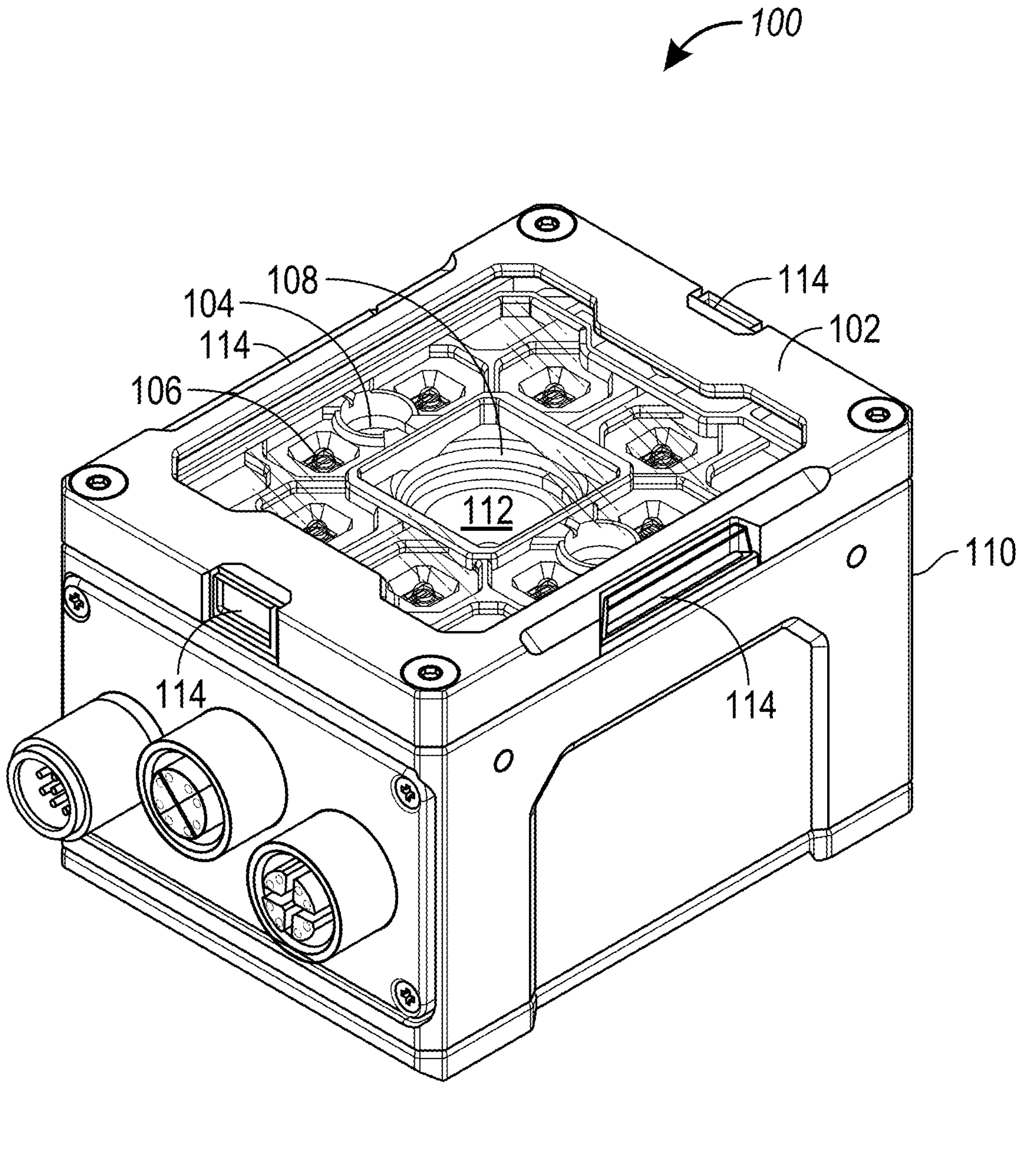
FIG. 1 is a perspective view of an electronic device (e.g., a scanning device), in accordance with some embodiments.

FIG. 1 is a perspective view of an electronic device 100 (e.g., a scanning device), in accordance with some embodiments. In some embodiments, the electronic device 100 is also referred to as a code reader, a barcode scanner, a label scanner, an optical scanner, or an image capturing system. In some embodiments, the electronic device 100 is part of an optical data reading system (e.g., a label scanning station). The electronic device 100 includes a housing 110 (e.g., a body or an exterior case) for protecting components that are located inside the electronic device 100. In some embodiments, the housing 110 includes integrated fittings or brackets to keep the internal components in place. In some embodiments, the electronic device 100 includes a top cover 102 positioned on the top side of the electronic device 100. In some embodiments, the top cover 102 is transparent or partially transparent.

In some embodiments, the electronic device 100 includes one or more distance sensors 104 (e.g., internal distance sensors), which are positioned within the electronic device 100. For example, referring to FIG. 1, a distance sensor 104 is positioned inside the electronic device 100 (e.g., adjacent to the top cover 102), and faces the front end of the electronic device 100. In some embodiments, the distance sensor 104 is included in a targeting module. The distance sensor 104 projects a beam of light at a target to aid in visual alignment of the target when the target is disposed on the electronic device 100. This helps align the camera to a center point of an imaging plane or a field of view. In some embodiments, each distance sensor 104 is a time-of-flight (TOF) sensor, an ultrasonic sensor, a radar sensor, a light detection and ranging (LiDAR) sensor, or an infrared (IR) distance sensor. In some embodiments, the electronic device 100 includes two or more distance sensors 104, each having the same type (e.g., each of the two or more distance sensors is a TOF sensor). In some embodiments, the electronic device 100 includes two or more distance sensors, at least two of which are of distinct types (e.g., the electronic device 100 includes a TOF distance sensor and a radar sensor). In some embodiments, the electronic device 100 includes one or more proximity sensors for sensing (e.g., detecting) if an object is within the sensing area where the proximity sensor is designed to operate. In some embodiments, the electronic device 100 uses distance measuring techniques, such as an image focus finder, an analog-to-digital conversion (ADC) circuit, and/or a digital-to-analog conversion (DAC) circuit, to determine the distance between a target object and the electronic device 100.

More specifically, in some embodiments, the distance sensor 104 is a TOF sensor. A TOF sensor measures the elapsed time from the emission of a signal (e.g., a wave pulse, an LED pulse, a laser pulse, or IR waves) from the sensor to the moment it returns to the sensor after reflecting off of an object. Distance is then calculated by using the speed of light in air and the time between sending/receiving the signal. In some embodiments, the distance sensor 104 is an ultrasonic sensor. An ultrasonic sensor, or a Sonar sensor, detects the distance to an object by emitting high-frequency sound waves. The ultrasonic sensor emits high-frequency sound waves towards a target object, and a timer is started. The target object reflects the sound waves back towards the sensor. A receiver picks up the reflected wave and stops the timer. The time taken for the wave's return is calculated against the speed of sound to determine the distance travelled. In some embodiments, the distance sensor 104 is a radar sensor. The radar sensor (e.g., a radar distance sensor) transmits high frequency radio waves (e.g., microwaves) and calculates the distance to an object by measuring the reflection of the radio waves from the object. In some embodiments, the radar sensor is configured to determine the distance, the angle, and the radial velocity of an object relative to the location of the electronic device 100. In some embodiments, the distance sensor 104 is a LiDAR sensor, which measures the range of a target object through light waves from a laser (e.g., instead of radio or sound waves). In some embodiments, the distance sensor 104 is an infrared (IR) distance sensor. An IR distance sensor works through the principle of triangulation, measuring distance based on the angle of the reflected beam.

In some embodiments, the electronic device 100 further includes a plurality of light sources 106 (e.g., 8 light emitting diodes (LEDs) in FIG. 1) mounted on a printed circuit board (PCB) 108. A light source 106 is also called a lighting source, an illumination source, or an illuminator. In some embodiments, the light sources 106 are part of an illumination system of the electronic device 100, which also includes illuminators (e.g., bright field and dark field illuminators), a reflector, and a lighting module. More details on the illumination system are described in U.S. patent application Ser. No. 14/298,659, filed Jun. 6, 2014, entitled "Combination Dark Field and Bright Field Illuminator," now U.S. Pat. No. 8,989,569, issued on Mar. 24, 2015, which is incorporated by reference herein in its entirety.

In some embodiments, the light sources 106 have one or more lighting types. Examples of the lighting types include, but are not limited to, LED light sources, laser light sources, and liquid crystal display (LCD) lights. Each of the lighting types has respective lighting characteristics, such as color (e.g., blue, red, or green) and/or intensity. The light sources 106 are mounted on (e.g., soldered on) the PCB 108, which is positioned within the electronic device 100 (e.g., behind the top cover 102). The PCB 108 includes a front surface facing the top cover 102 of the electronic device 100. In some embodiments, the light sources mounted on the front surface of the PCB 108 includes both long range light sources and low angle light sources.

In some embodiments, the electronic device 100 includes a camera 112. A lens of the camera 112 is exposed via an opening of the PCB 108 and physically surrounded by the light sources 106. The light sources 106 are grouped into a plurality of illumination units (e.g., a first illumination unit and a second illumination unit). Each illumination unit is configured to be independently controlled to illuminate a distinct region of the field of view of the camera 112. In an example, every two light sources 106 near a corner of the top cover 102 are grouped to form an illumination unit. Four illumination units are independently controlled to illuminate respective regions of a field of view of the camera 112 in a sequential or concurrent manner.

In some embodiments, the electronic device 100 further includes one or more indicators 114. Each indicator 114 is located at an edge of the top cover 102 of the electronic device 100, and configured to be illuminated according to a light pattern in which a single color or different colors are displayed for a sequence of temporal durations defined based on the frequency. In some situations, the light pattern represents a message including data or status of the electronic device 100. For example, the indicators 114 are illuminated with a red color continuously in response to detection of the presence of a product on or near the top cover, and turn to a green color and stay in green for a shortened duration of time in response to a successful scan of a barcode displayed on the product. In some embodiments, each indicator 114 includes one or more LEDs from which light is emitted, and the light is displayed on the indicator 114 in a substantially uniform and homogeneous manner.

Figure 2:
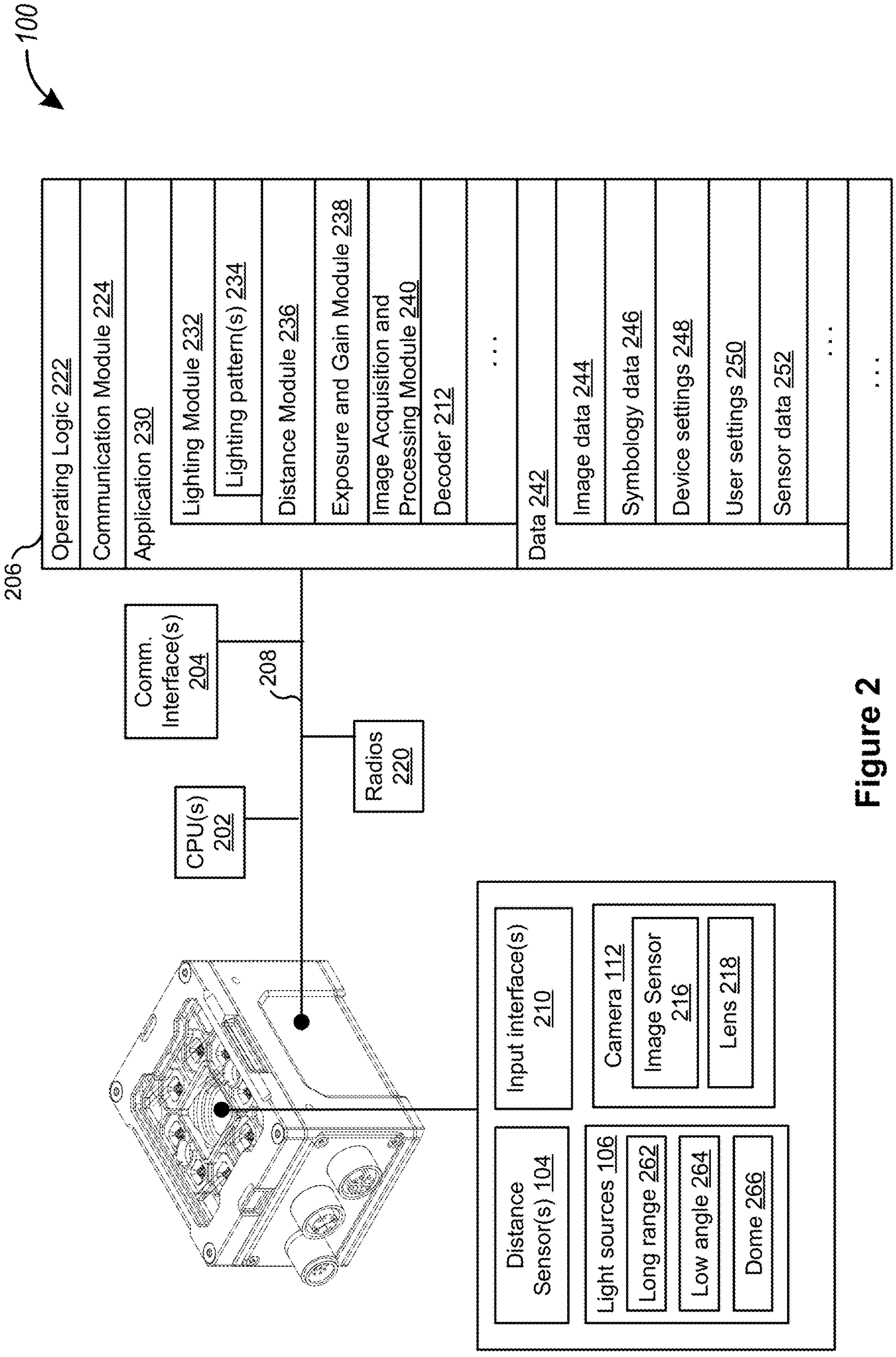
FIG. 2 is a block diagram of an example electronic device, in accordance with some embodiments.

FIG. 2 is a block diagram of an example electronic device 100, in accordance with some embodiments. The electronic device 100 includes one or more distance sensors 104, as described previously with respect to FIG. 1. In some embodiments, the one or more distance sensors 104 include one or more of: a time-of-flight sensor, an ultrasonic sensor, a radar sensor, or a LiDAR sensor. In some embodiments, the electronic device 100 includes one or more proximity sensors for sensing (e.g., detecting) if an object is within the sensing area where the proximity sensor is designed to operate. In some embodiments, the electronic device 100 uses distance measuring techniques, such as an image focus finder, analog-to-digital conversion (ADC), and/or digital-to-analog conversion (DAC), to determine the distance between a target object and the electronic device 100.

The electronic device 100 includes light sources 106. In some embodiments, the light sources 106 include a long range light source 262, a low angle light source 264, and/or a dome light source 266, as described in FIG. 3 and in U.S. patent application Ser. No. 14/298,659, filed Jun. 6, 2014, entitled "Combination Dark Field and Bright Field Illuminator," now U.S. Pat. No. 8,989,569, which issued on Mar. 24, 2015 and is incorporated by reference herein in its entirety. In some embodiments, the light sources 106 provide illumination in visible light. In some embodiments, the light sources 106 provide illumination in invisible light (e.g., in infrared light or violet light).

In some embodiments, the electronic device 100 includes a decoder 212 for decoding data contained in a barcode and sending the data to a computer device. In some embodiments, the decoder 212 is part of a software application 230. Details of the decoder 212 are described in U.S. patent application Ser. No. 14/298,659, filed Jun. 6, 2014, entitled "Combination Dark Field and Bright Field Illuminator," now U.S. Pat. No. 8,989,569, which issued on Mar. 24, 2015 and is incorporated by reference herein in its entirety.

In some embodiments, the electronic device 100 includes one or more input interfaces 210 for facilitating user input. In some embodiments, the electronic device 100 is a battery-operated device and includes a rechargeable battery. In this instance, the input interface 210 can include a charging port for charging the battery.

In some embodiments, the electronic device 100 includes a camera 112, which includes an image sensor 216 and a lens 218. The lens 218 directs the path of light rays and concentrates them onto the image sensor 216, to re-create the image as accurately as possible on the image sensor. The image sensor 216 converts light (e.g., photons) into electrical signals that can be interpreted by the electronic device 100.

In some embodiments, the lens 218 is an optical lens and is made from glass or other transparent material. In some embodiments, the lens 218 is a liquid lens that is composed of an optical liquid material, and whose shape, focal length, and/or working distance varies when a current or voltage is applied to the liquid lens. In some embodiments, the electronic device 100 (e.g., via the processor(s) 202) uses distance information obtained by the distance sensor 104, to determine the optimal current or voltage to apply to the liquid lens 218 so as to have the optimal focal length for decoding the barcode data contained in an image. In some embodiments, the camera 112 is configured to capture images in color. In some embodiments, the camera 112 is configured to capture images in black and white.

The electronic device 100 also includes one or more processors (e.g., CPU(s)) 202, one or more communication interface(s) 204 (e.g., network interface(s)), memory 206, and one or more communication buses 208 for interconnecting these components (sometimes called a chipset).

In some embodiments, the electronic device 100 includes radios 220. The radios 220 enable one or more communication networks, and allow the electronic device 100 to communicate with other devices, such as a computer device or a server. In some embodiments, the radios 220 are capable of data communication using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, Ultrawide Band (UWB), and/or software defined radio (SDR)), custom or standard wired protocols (e.g., Ethernet or HomePlug), and/or any other suitable communication protocol, including communication protocols not yet developed as of the filing date of this patent application.

The memory 206 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 206 includes one or more storage devices remotely located from one or more processor(s) 202. The memory 206, or alternatively the non-volatile memory within the memory 206, includes a non-transitory computer-readable storage medium. In some embodiments, the memory 206, or the non-transitory computer-readable storage medium of the memory 206, stores the following programs, modules, and data structures, or a subset or superset thereof:

- operating logic 222, including procedures for handling various basic system services and for performing hardware dependent tasks;
- a communication module 224 (e.g., a radio communication module), which connects to and communicates with other network devices (e.g., a local network, such as a router that provides Internet connectivity, networked storage devices, network routing devices, server systems, computing devices, and/or other connected devices) coupled to one or more communication networks via the communication interface(s) 204 (e.g., wired or wireless);
- an application 230, which acquires images that contain labels (e.g., barcodes) and decodes the labels, and controls one or more components of the electronic device 100 and/or other connected devices in accordance with the determined state. In some embodiments, the application 230 includes:
  - a lighting module 232, which selects and deploys (e.g., based on distance measurements, such as direct measurements from the distance sensor(s) 104 or indirect measurements) one or more light sources 106 and/or sequences of lighting patterns 234 for a current read cycle;
  - a distance module 236, which determines (e.g., selects) which sequence of focus distances to be employed during the current read cycle, based on distance measurements from the distance sensor(s) 104;
  - an exposure and gain module 238, which samples images 244 captured by the camera 112;
  - an image acquisition and processing module 240, which acquires and processes images, e.g., in accordance with a process illustrated in one of FIGS. 4-6 and 8; and
  - a decoder 212 for decoding data contained in a barcode and sending the data to a computer device;
- data 242 for the electronic device 100, including but not limited to:
  - image data 244 (e.g., camera data);
  - symbology data 246 (e.g., types of codes, such as bar codes);
  - device settings 248 for the electronic device 100, such as default options, image acquisition settings (e.g., exposure and gain settings), and preferred user settings; and
  - user settings 250, such as a preferred shade for the lenses (e.g., for photochromic lenses); and
  - sensor data 252 that is acquired (e.g., measured) from the distance sensor(s) 104 and/or other sensors that are included in the electronic device 100.

In some embodiments, the distance sensor 104 is monitored by the lighting module 232. When the user commences a current read cycle, the distance sensor 104 identifies a distance field (e.g., near field, medium field, or far field) corresponding to the location of the target object. The lighting module 232 selects a lighting sequence, corresponding to the distance field, for execution. If a good read was achieved in a previous read cycle (e.g., a good read from the third lighting pattern of the near field lighting sequence), and the current read cycle has the same distance field as the previous read cycle, the application 230 will commence the current read cycle by using values of the earlier good read (e.g., the third lighting pattern of the near field lighting pattern, the previous focus position, the exposure, and/or the gain), before starting the lighting sequence from the beginning. Users are typically reading many similar parts, and the apparatus can achieve a good read sooner if it starts with known good settings from the last decode operation. If no previous settings lead to a good read, then the lighting sequence for the current distance field starts at the beginning and iterates through each sequence capture-after-capture.

In some embodiments, the exposure and gain module 238 rejects images that do not fall within predefined attribute ranges for "brightness" and/or "sharpness" (e.g., the rejected images are not processed by the image acquisition and processing module 240). In some embodiments, the exposure and gain module 238 updates image acquisition settings (such as exposure and gain) for the next coming image capture in order to provide the optimal "brightness" for image processing.

In some embodiments, after an image is captured (e.g., using the camera 112), the electronic device 100 (e.g., via the application 230) evaluates the quality of an acquired image. For example, the electronic device 100 reads (e.g., determines) a sharpness value, an average light mean value, and/or an average dark mean value of the image, to determine whether to qualify or reject the image. If the results do not meet or exceed predefined target values, the image is rejected and another image is recaptured. If the results meet or exceed the predefined target values, the image is processed (e.g., by the image acquisition and processing module 240).

As an example, in some embodiments, a good quality image is an image sample that has a light mean score between 100-170 (out of the range of 0 to 255), a dark mean score between 20-80 (out of the range of 0 to 255), and a sharpness score above 6000 (out of the range from 0 to about 12,000).

In some embodiments, data collected during the image sampling (e.g., evaluation) is captured and added (e.g., as data 242).

In some embodiments, after qualifying the image, the electronic device 100 (e.g., via the application 230) determines whether to adjust the exposure or gain setting (e.g., using a light mean correction path or a dark mean correction path) for the next image. Should it decide to do so, the electronic device 100 gathers the target light mean and dark mean values for comparison, deploys a Proportional and Integral (PI) Controller transfer function, and computes necessary changes to exposure in order to obtain an ideal exposure in the next image.

In some embodiments, upon successful decode of an image, the exposure, gain, and focus values are fed back to the application 230. On the following read cycle, the application 230 checks if these decode settings are pending. If they are, the electronic device 100 attempts to load camera settings and any previous settings, as opposed to calculating the next configuration of settings. Should the previous decode settings be used, the application 230 samples the image for data but does not adjust the feedback controller's values.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 206 stores a subset of the modules and data structures identified above. Furthermore, the memory 206 may store additional modules or data structures not described above. In some embodiments, a subset of the programs, modules, and/or data stored in the memory 206 are stored on and/or executed by a server system, and/or by an external device (e.g., a computing device).

Figure 3:
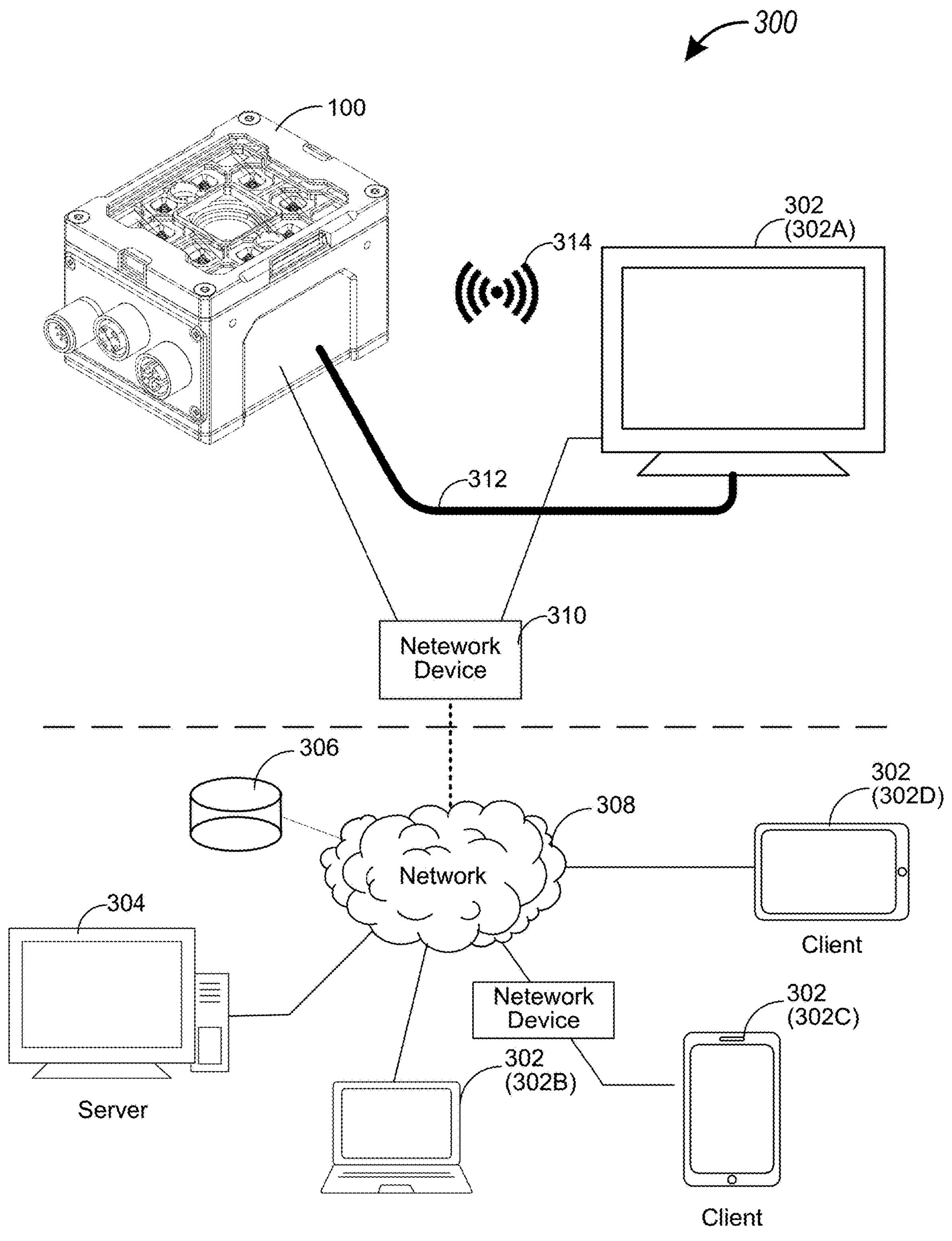
FIG. 3 is an example image processing environment including an electronic device that processes images data using parallel pipelines, in accordance with some embodiments.

FIG. 3 is an example image processing environment 300 including an electronic device 100 that processes images data using parallel pipelines, in accordance with some embodiments. In some embodiments, the electronic device 100 is an imaging device. In some embodiments, the electronic device 100 is a code reader, a barcode scanner, a label scanner, or an optical scanner. In some embodiments, the electronic device 100 is part of an optical data reading system (e.g., a label scanning station). In some embodiments, the electronic device 100 is configured to obtain image data including one or more images, process the image data using the parallel pipelines, and provide report data 312 generated from the image data to one or more client devices 302 (e.g., devices 302A, 302B, 302C, or 302D). The one or more client devices 302 may be, for example, desktop computers, tablet computers, mobile phones, or intelligent, multi-sensing, network-connected home devices (e.g., a display assistant device). Each client device 302 can collect the report data 312 from the electronic device 100, receive user inputs, execute user applications, and present the report data 312 or other information on its user interface. In some embodiments, a user application includes an interactive user application. A user interface of the interactive user application is displayed on the client device to receive the user inputs associated with the electronic device 100 and visualize the report data 312 generated by the electronic device 100.

The electronic device 100 is configured to enable a plurality of parallel pipelines. The electronic device 100 identifies a plurality of image processing cycles associated with a temporal sequence of triggers, and each image processing cycle is created in response to one or more respective trigger events (e.g., one or more image capturing operations). The plurality of image processing cycles is assigned to a plurality of parallel pipelines. A pre-existing cycle data container is directly pulled from a cycle data pool for each parallel pipeline. The electronic device processes the plurality of image processing cycles in the plurality of parallel pipelines to generate respective report data independently of one another. In some embodiments, the temporal sequence of triggers correspond to an ordered sequence of images that is processed during the image processing cycles. The report data 312 of the image processing cycles is generated separately from the plurality of parallel pipelines, independently of the order of the sequence of images. In some situations, the report data of the image processing cycles is organized and provided to the client device 302 according to the order of the corresponding sequence of images.

In some embodiments, the user application implemented on the client device 302 is driven by a first programming language, and the plurality of image processing cycles are executed on the electronic device 100 by a second programming language distinct from the first programming language. The plurality of image processing cycles is configured to exchange instructions and data with the user application automatically via an intermediate data representation between the first and second programming languages. For example, the intermediate data representation is implemented in JSON (JavaScript Object Notation). The user application includes a web-based user interface, and the first programming language includes JavaScript. A runtime associated with the image processing cycles uses the second language (e.g., C++). JSON is a native format for the runtime by building JSON support into nearly every runtime C++ object, thereby allowing the JavaScript program to understand a workflow format or a report format that is used by the runtime automatically.

In some embodiments, the report data 312 or user inputs are processed locally at the client device 302 and/or remotely by the server(s) 304. The one or more servers 304 provide system data (e.g., boot files, operating system images, and user applications) to the client devices 302, and in some embodiments, process the report data 312 and user inputs received from the client device(s) 302 when the user application is executed on the client devices 302. In some embodiments, the data processing environment 300 further includes a storage device 306 for storing data related to the servers 304, client devices 302, electronic device 100, and user applications executed on the client devices 302. For example, the storage device 306 may store video content, static visual content, and a product database.

The one or more servers 304, the one or more client devices 302, the electronic device 100, and the storage device 306 are communicatively coupled to each other via one or more communication networks 308, which are the medium used to provide communications links between these devices and computers connected together within the data processing environment 300. The one or more communication networks 308 may include connections, such as wire, wireless communication links, or fiber optic cables. Examples of the one or more communication networks 308 include local area networks (LAN), wide area networks (WAN) such as the Internet, or a combination thereof. The one or more communication networks 308 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. A connection to the one or more communication networks 308 may be established either directly (e.g., using 3G/4G connectivity to a wireless carrier), or through a network interface 310 (e.g., a router, a switch, a gateway, a hub, or an intelligent, dedicated whole-home control node), or through any combination thereof. As such, the one or more communication networks 308 can represent the Internet of a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other electronic systems that route data and messages.

In some embodiments, the electronic device 100 is communicatively coupled to the client device 302 (302A) via a wired communication link 312. In some embodiments, the electronic device 100 is communicatively coupled to the client device 302 (302A) via a local communication network 314 enabled by the network interface 310. Both the electronic device 100 and client device 302 (e.g., 302A) are located in the same venue (e.g., a warehouse or a factory). In some embodiments, the electronic device 100 is remote from the client device 302, and communicatively coupled to the client device 302 (e.g., devices 302B, 302C, and/or 302D) via at least a WAN.

Figure 4:
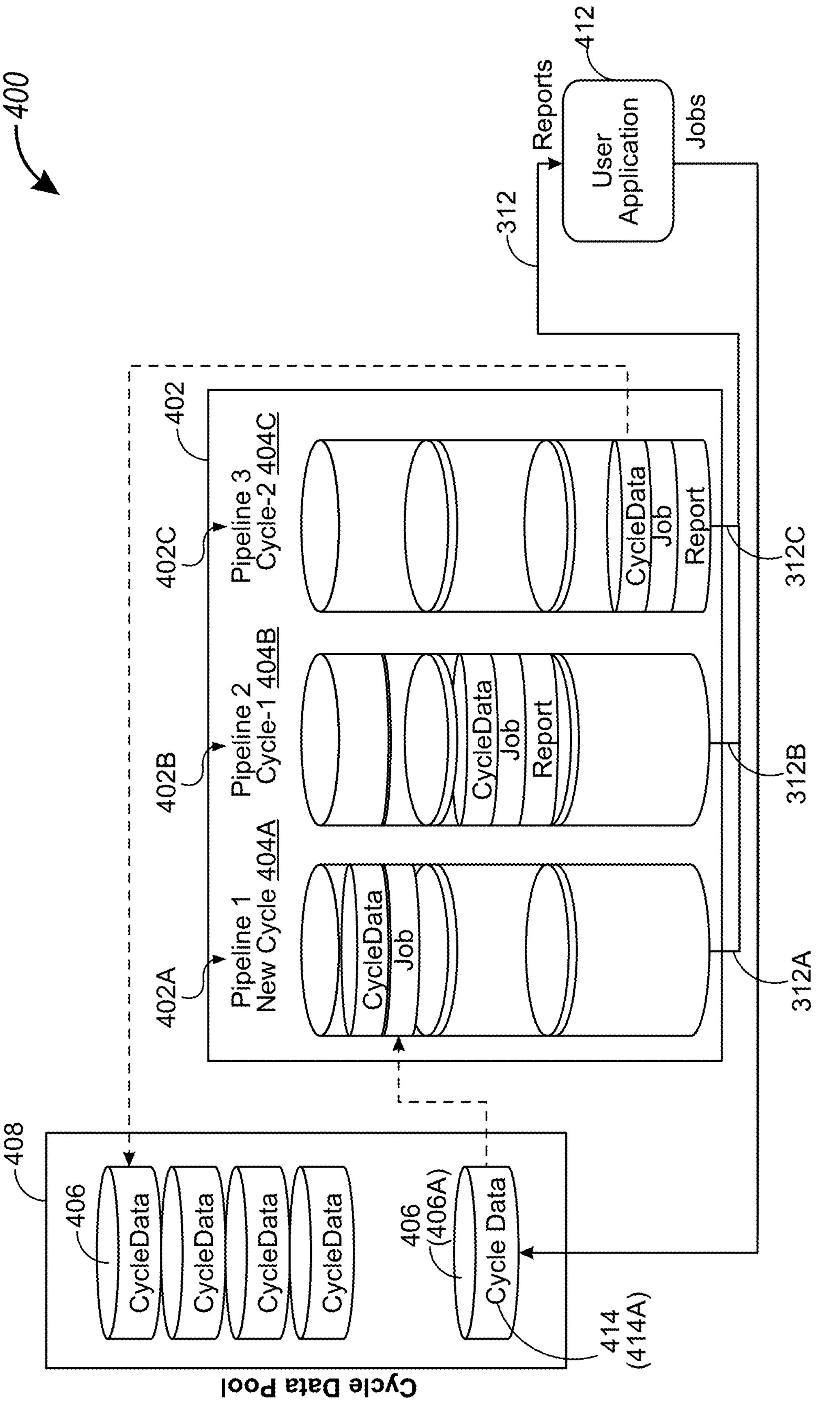
FIG. 4 illustrates a process of processing image data in a plurality of parallel pipelines, in accordance with some embodiments.

FIG. 4 illustrates a process 400 of processing image data in a plurality of parallel pipelines 402 (e.g., 402A, 402B, and 402C), in accordance with some embodiments. The process 400 is implemented by an electronic device 100 having memory 206 and one or more processors 202. For example, the process 400 is executed by the processors 202 according to instructions provided by an image acquisition and processing module 240 of the electronic device 100. The electronic device 100 identifies a plurality of image processing cycles 404 associated with a temporal sequence of triggers (e.g., acquisitions of images). Each image processing cycle 404 (e.g., 404A, 404B, and 404C) is created in response to one or more respective trigger events (e.g., capturing a single image or capturing a set of images). The plurality of image processing cycles 404 is assigned to a plurality of parallel pipelines 402. For each parallel pipeline 402, a pre-existing cycle data container 406 (e.g., 406A) is pulled from a cycle data pool 408. In some embodiments, the cycle data pool 408 includes a predefined number of cycle data containers 406 prior to identifying the plurality of image processing cycles 404. Once assigned to a respective image processing cycle 404, each parallel pipeline 402 directly uses one of the predefined number of cycle data containers 406 without waiting for creation of a new cycle data container 406. This expedites initiation and execution of each parallel pipeline 402. In some situations, the cycle data containers 406 have been fully used with different pipelines 402, and no cycle data container 406 can be pulled for a pipeline 402 assigned with a new image processing cycle 404.

After the plurality of image processing cycles 404 is assigned to the plurality of parallel pipelines 402, the plurality of image processing cycles 404 is processed in the plurality of parallel pipelines 402 independently of one another, thereby generating report data 312 (e.g., 312A, 312B, and 312C) independently. The report data 312 is provided to a client device 302 for further processing (e.g., storage, classification, analysis, and/or visualization). In some embodiments, the client device 302 is coupled to the electronic device 100 via a local communication network, and executes an interactive user application 412. For example, the client device 302 and the electronic device 100 are located in a factory automation network that has no access to the Internet. The interactive user application 412 includes a user interface configured to configure, adjust, and debug the electronic device 100 and its associated workflows and jobs locally. In some embodiments, the interactive user application 412 is web-based and implemented on the client device 302, which is coupled to a WAN (e.g., the Internet). For example, a web-based user interface is enabled in a browser-based user application 412. The browser-based user application 412 is served directly from the client device 302, and communicates with the electronic device 100 using HTTP and web sockets. A web-based user interface is presented to allow the client device 302 to configure, adjust, and debug the electronic device 100 and its associated workflows and jobs remotely.

In some embodiments, the process 400 enables highly interactive browser based user experience by exchanging data structures between the web-based user interface of the user application 412 and the runtime of the plurality of parallel pipelines 402. In some embodiments, the user application 412 is implemented based on Hypertext Transfer Protocol (HTTP), and the client device 302 executing the user application 412 includes an Internet of Things (IOT) device. In an example, configuration of the user application 412 and the pipelines 402 is done via a data exchange scheme using JavaScript Object Notation (JSON), allowing a JavaScript driven web-based user interface to interact natively with a core runtime implemented in C++ or other non-dynamic computer languages.

In some embodiments, a first trigger event of a first image processing cycle 404A precedes a second trigger event of a second image processing cycle 404B. Second report data 312B of the second image processing cycle 404B is provided to the client device 302 after first report data 312A of the first image processing cycle 404A, independently of whether the second report data 312B is available before or after the first report data 312A. Alternatively, in some embodiments, independently of the temporal order of the first and second trigger events, whichever one of the first and second report data 312A and 312B is first available is reported to the client device 302 first. If the second report data 312B of the second image processing cycle 404B is available before the first report data 312A of the first image processing cycle 404A, the second report data 312B is provided to the client device 302 before the first report data 312A. If the second report data 312B is available after the first report data 312A, the second report data 312B is provided to the client device 302 after the first report data 312A.

For each parallel pipeline 402, the pre-existing cycle data container 406 is pulled from a cycle data pool 408 and used to store cycle data 414 associated with the corresponding image processing cycle 404. For example, a first image processing cycle 404A is implemented in a first parallel pipeline 402A. First cycle data 414A includes image data associated with one or more respective trigger events of the first image processing cycle 404A and intermediate data that is generated by, and passed among, a plurality of stages of the first image processing cycle 404A. In some embodiments, the first cycle data 414A includes first report data 312A generated from the intermediate data and reported to the client device 302. In some embodiments, all of the image data, intermediate data, and report data of the first image processing cycle 404A is reported to the client device 302. Alternatively, in some embodiments, only the report data 312A of the first image processing cycle 404A is reported to the client device 302.

In an example, the electronic device 100 is configured to recognize a bar code in an image. A first image processing cycle 404A is created in response to a first trigger event 602 in which an image including a bar code is captured. The first cycle data 414 associated with the first image processing cycle 404 includes a serial number corresponding to the bar code. First report data 312A generated from the first image processing cycle 404 includes a product name and a price of a product.

In some prior art implementations, each pipeline has fixed stages, which are staggered so that a first stage of a current cycle runs concurrently with a second stage of a previous cycle that precedes the current cycle. In contrast, in various implementations of this application, the parallel pipelines 402 have no such limitation, and each parallel pipeline 402 is switched on for a corresponding image processing cycle 404 without any overhead. Each cycle's stages are run within the same pipeline 402, while the pipeline 402 includes a managed number of threads and is associated with a cycle data container 406 pulled from a cycle data pool 408.

Figure 5:
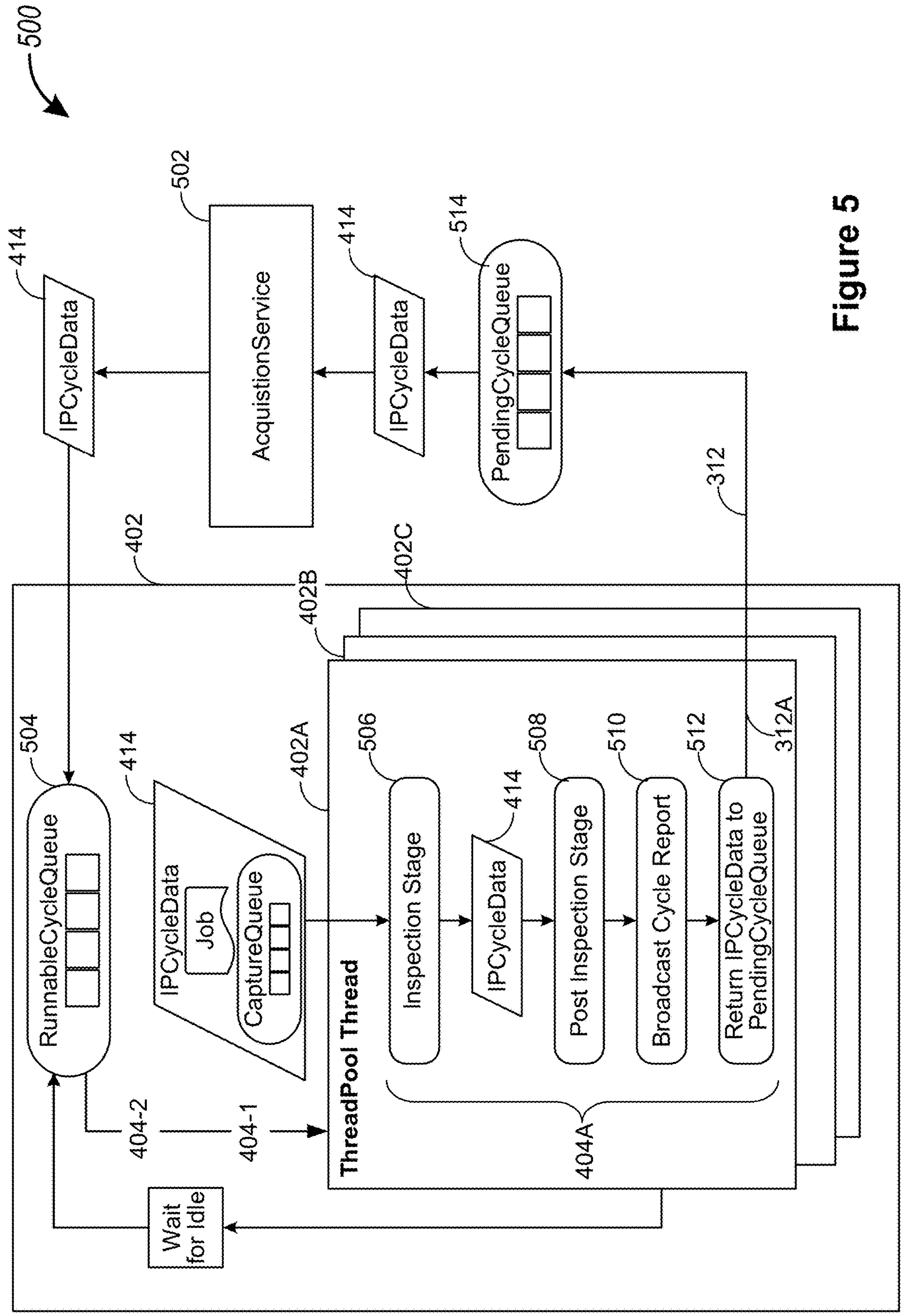
FIG. 5 illustrates another example process of processing image data in a plurality of parallel pipelines, in accordance with some embodiments.

FIG. 5 illustrates another example process 500 of processing image data in a plurality of parallel pipelines 402, in accordance with some embodiments. The process 500 is implemented by an electronic device 100 having memory 206 and one or more processors 202 (FIG. 2). For example, the process 500 is executed by the processors 202 according to instructions provided by an image acquisition and processing module 240 of the electronic device 100. The electronic device 100 provides acquisition service 502, which identifies a plurality of image processing cycles 404 associated with a temporal sequence of triggers (e.g., acquisitions of images). Each image processing cycle 404 (e.g., 404A, 404B, and 404C) is created in response to one or more respective trigger events (e.g., capturing a single image, capturing a set of images). Based on a temporal order of the triggers, the plurality of image processing cycles is arranged in a runnable cycle queue 504. The plurality of image processing cycles 404 is assigned to a plurality of parallel pipelines 402. For each parallel pipeline 402, a pre-existing cycle data container 406 (e.g., 406A) is pulled from a cycle data pool 408. Cycle data 414 is associated with, or generated for, each image processing cycle 404 and stored in the corresponding cycle data container 406 during the course of managing and executing the image processing cycle 404.

In some embodiments, a first image processing cycle 404A is implemented in a first parallel pipeline 402A to inspect an input image, e.g., to detect smearing of a label on a drug bottle. The first image processing cycle 404A includes a plurality of stages, e.g., an inspection stage 506, a post inspection stage 508, a report generation stage 510, and a data returning stage 512. The input image is inspected in the inspection stage 506 and generated intermediate data stored with the cycle data 414 in the cycle data container 406A. The intermediate data is further processed in the post inspection stage 508 to provide additional information, which is used to generate first report data 312A in the report generation stage 510. The first report data 312A is placed in a queue of pending data 514 to be provided to the client device 302 in the data returning stage 512. In some embodiments, report data 312 is organized in the queue of pending data 514 based on a temporal order of associated trigger events. Alternatively, in some embodiments, report data 312 is organized in the queue of pending data 514 based on a temporal order of its own availability, independently of the temporal order of associated trigger events.

Each stage of an image processing cycle 404A is not limited by fixed hardware allocation, and has a flexible access to hardware resources allocated to a corresponding parallel pipeline 402A. Stated another way, each stage of the image processing cycle 404A can be either accelerated using all of the allocated pipeline hardware resources or executed in parallel with one or more remaining stages of the image processing cycle 404A.

In some embodiments, the plurality of image processing cycles 404 that is assigned to the plurality of pipelines 402 includes a plurality of first image processing cycles 404-1. The runnable cycle queue 504 further includes a plurality of second image processing cycles 404-2 following the first image processing cycles 404-1. When the plurality of pipelines 402 is fully occupied by the plurality of first image processing cycles 404-1, a state signal 516 (e.g., "wait for idle") is sent to the runnable cycle queue 504, requesting that the runnable cycle queue 504 hold the plurality of second image processing cycles 404-2 until the plurality of pipelines 402 completes processing of the plurality of first image processing cycles 404-1.

High precision instrumentation is built in, allowing a deep and intuitive understanding of the effects of adjusting the various performance parameters, including the loading of threads, processes, and cores, and hardware utilization. This capability is designed in such a way to permit a real-time performance visualizer in a web-based user interface. It also permits deep analysis during execution, with the potential for auto-adjusting parameters for maximum performance without user intervention. In some embodiments, while processing the plurality of first image processing cycles 404-1 in the plurality of parallel pipelines 402, the electronic device 100 dynamically adjusts one or more parameters of: a number of pipelines, a size of thread pools, thread priorities, delays, throttling parameters, core assignments, acquisition parameters, lighting, and camera focus. The plurality of second image processing cycles 404-2 is assigned to the plurality of parallel pipelines 402, and processed in the parallel pipelines 402 based on the one or more adjusted parameters. Specifically, in an example, the electronic device 100 monitors central processing unit (CPU) core utilization. Based on the CPU core utilization, the electronic device 100 dynamically adjusts respective computational resources allocated to the plurality of parallel pipelines. As such, parameters that control limits on hardware use (e.g., CPU core utilization) are dynamically tunable, and can be changed while running. It is possible to measure and automatically adjust these parameters to tailor the runtime for best performance depending on the situation.

Figure 6:
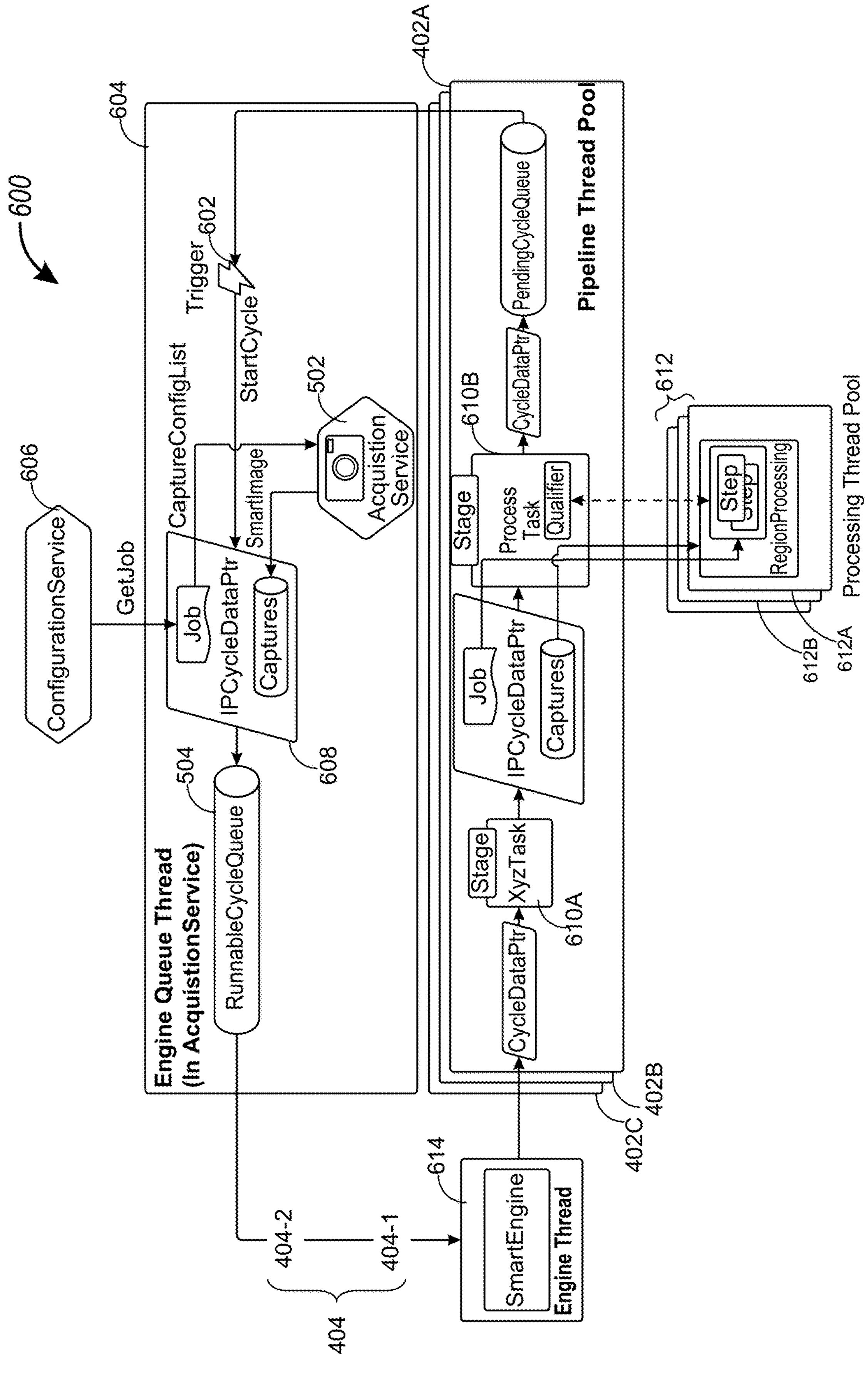
FIG. 6 illustrates another example process of processing image data in a plurality of parallel pipelines, in accordance with some embodiments.

FIG. 6 illustrates another example process 600 of processing image data in a plurality of parallel pipelines 402, in accordance with some embodiments. The process 600 is implemented by an electronic device 100 having memory 206 and one or more processors 202 (FIG. 2). For example, the process 600 is executed by the processors 202 according to instructions provided by an image acquisition and processing module 240 of the electronic device 100. The electronic device 100 provides acquisition service 502, which identifies a plurality of image processing cycles 404 associated with a temporal sequence of triggers 602 (e.g., acquisitions of images) in an engine queue thread 604. Each image processing cycle 404 (e.g., 404A, 404B, and 404C) is created in response to one or more respective trigger events 602 (e.g., capturing a single image, capturing a set of images). In some embodiments, the electronic device 100 further includes configuration service 606, which provides job configurations applied to define (operation 608) the image processing cycles 404 to process the image data captured by the temporal sequence of triggers 602. Based on a temporal order of the triggers 602, the plurality of image processing cycles 404 is arranged in a runnable cycle queue 504. The plurality of image processing cycles 404 is assigned to a plurality of parallel pipelines 402. For each parallel pipeline 402, a pre-existing cycle data container 406 (e.g., 406A) is pulled from a cycle data pool 408. Cycle data 414 is associated with, or generated for, each image processing cycle 404 and stored in the corresponding cycle data container 406 during the course of managing and executing the image processing cycle 404.

A trigger event 602 includes acquisition of a single image, and the single image is processed in a corresponding image processing cycle 404. The single image is optionally processed via a plurality of stages 610 (e.g., 610A and 610B) that are managed in a single thread 612 or a plurality of threads 612 of the image processing cycle 404. Stated another way, in some situations not shown, a first stage 610A is implemented at least partially in parallel with a second stage 610B. In some embodiments, a plurality of trigger events 602 includes acquisition of a plurality of images. In response to the plurality of trigger events 602, an image processing cycle 404 is executed to process the plurality of images associated with the plurality of trigger events 602 in a plurality of stages 610. The plurality of stages 610 is optionally processed by a single thread 612 or a plurality of threads 612 of the image processing cycle 404. One of the plurality of images is optionally processed via a plurality of stages that are managed in an associated single thread 612 or a subset of the plurality of threads 612 of the image processing cycle 404. In an example, a stage 610B of image processing is implemented a subset of parallel threads 612. In some embodiments, the electronic device 100 successively implements each of a sequence of stages of an image processing cycle 404 using all or part of first hardware resources allocated to a corresponding parallel pipeline 402.

It is noted that a corresponding cycle data container 406 is populated with the plurality of images provided to the parallel pipeline 402. The cycle data container 406 optionally stores raw image data of the plurality of images or pre-processed image data of the plurality of images (e.g., filtered images, corrected images, associated image features). In some embodiments, an image signal processor (ISP) is configured to filter or correct the raw image data captured by a camera. Each image processing cycle 404 is configured to process the raw or pre-processed image data.

In some embodiments, a first image processing cycle 404 includes a first thread 612A and a second thread 612B. The second thread 612B optionally starts before or after the first thread 612. The first thread 612A generates a first subset of the first cycle data 414. The second thread 612B is initiated before generation of the first subset of the first cycle data 414, and suspended to wait until the first subset of the first cycle data 414 is generated and provided by the first thread 612A.

In some embodiments, a workflow template is loaded on the first parallel pipeline 402A. The plurality of stages 610 of the first image processing cycle 404A is implemented without being interrupted by the remaining image processing cycles (e.g., 402B and 402C in FIG. 4). A plurality of stages 610 of a distinct image processing cycle 404 may be implemented in a second parallel pipeline 402B using an identical or different workflow template. There is no overhead to switch between workflow templates while implementing these two image processing cycles separately in two pipelines 402.

In some embodiments, the plurality of stages 610 of an image processing cycle 404 is forced to follow a temporal sequencing with a previous image processing cycle. This makes certain operations (e.g. sending result data) happen in sequence between cycles. For example, both of the image processing cycles 404A and 404B are processed by the first parallel pipeline 402A, and the second image processing cycle 404B follows the first image processing cycle 404A. The stages 610 of the second image processing cycle 402B is forced to follow a temporal sequencing with the first image processing cycle 402A. First report data 312A generated by the first image processing cycle 402A is optionally used by the second image processing cycle 402B.

The electronic device 100 includes a state managed asynchronous runtime engine 614 configured to keep a runtime in a known state. Instead of individual commands to change parameters or having to set a mode to perform an operation, the state of the runtime is always coherent, and can only be changed to a new state (or not if the new state is not accepted). This eliminates much of the complication of managing user experience (for example, undo is trivial). In some embodiments, the state used by an image processing cycle 404 is included in cycle data 414 stored in the cycle data container 406. The cycle data 414 flows through the stages and operations of the image processing cycle 404 implemented in the parallel pipeline 402. Application of the cycle data in the cycle data container 406 maximizes parallelism with other services, such as image acquisition. The cycle data container 406 contains all the information needed to complete the objective for the corresponding image processing cycle 404, and can be completely swapped for a new objective on the next image processing cycle 404.

In some embodiments, the cycle data 414 further includes input queues for data that is obtained or generated during execution of a parallel pipeline 402. For example, acquisition of images is optionally overlapped with other processing, and the images are pushed to a queue within the cycle data 414, when a stage 610 needs the image data and there is a potential to block if the data has not arrived yet.

Figure 7:
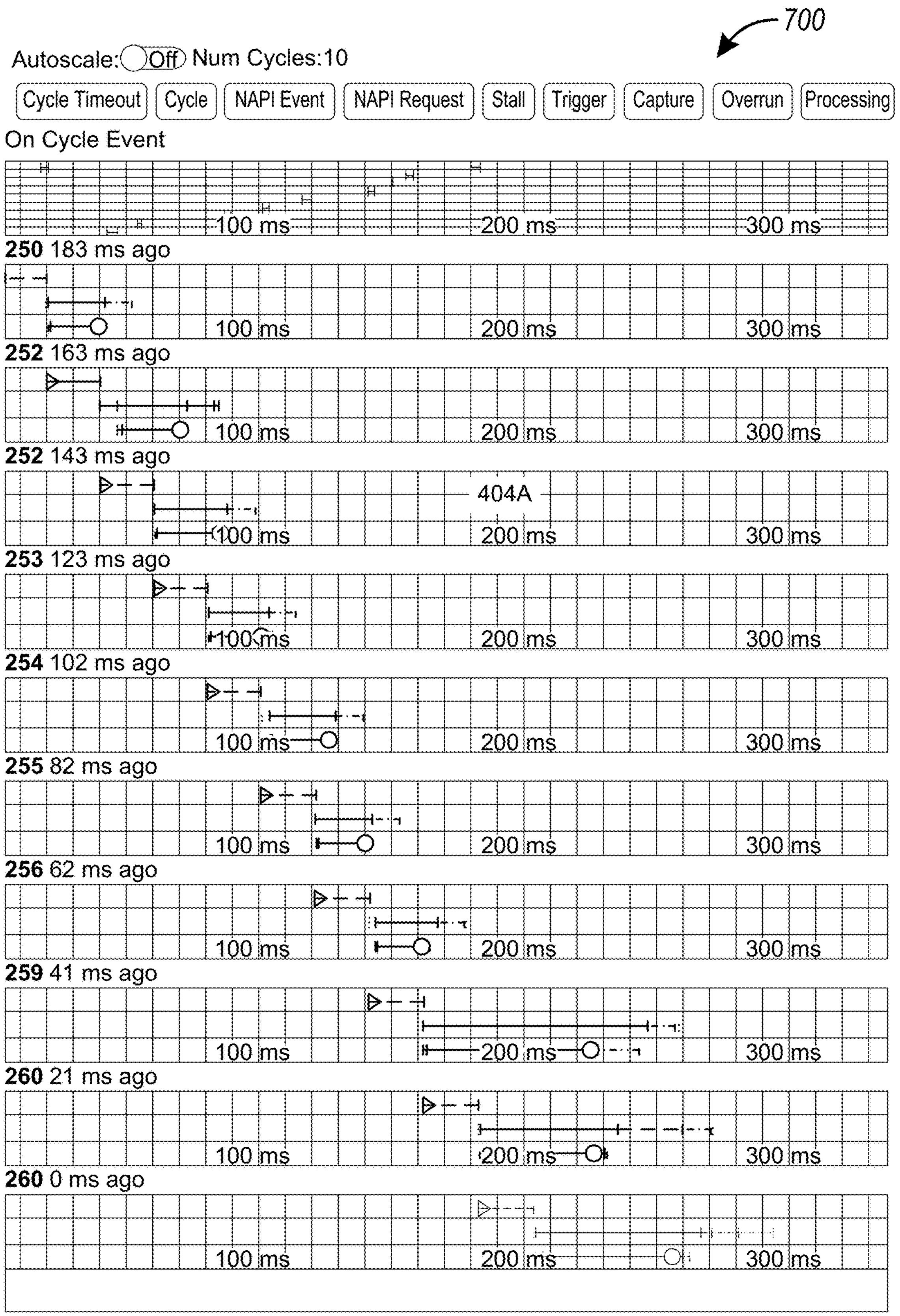
FIG. 7 is a temporal diagram of a plurality of image processing cycles implemented in a plurality of parallel pipelines, in accordance with some embodiments.

FIG. 7 is a temporal diagram 700 of a plurality of image processing cycles 404 implemented in a plurality of parallel pipelines 402, in accordance with some embodiments. Each of the plurality of image processing cycles 404 is processed in a respective parallel pipeline 402, independently of remaining image processing cycles in respective remaining parallel pipelines.

Figure 8:
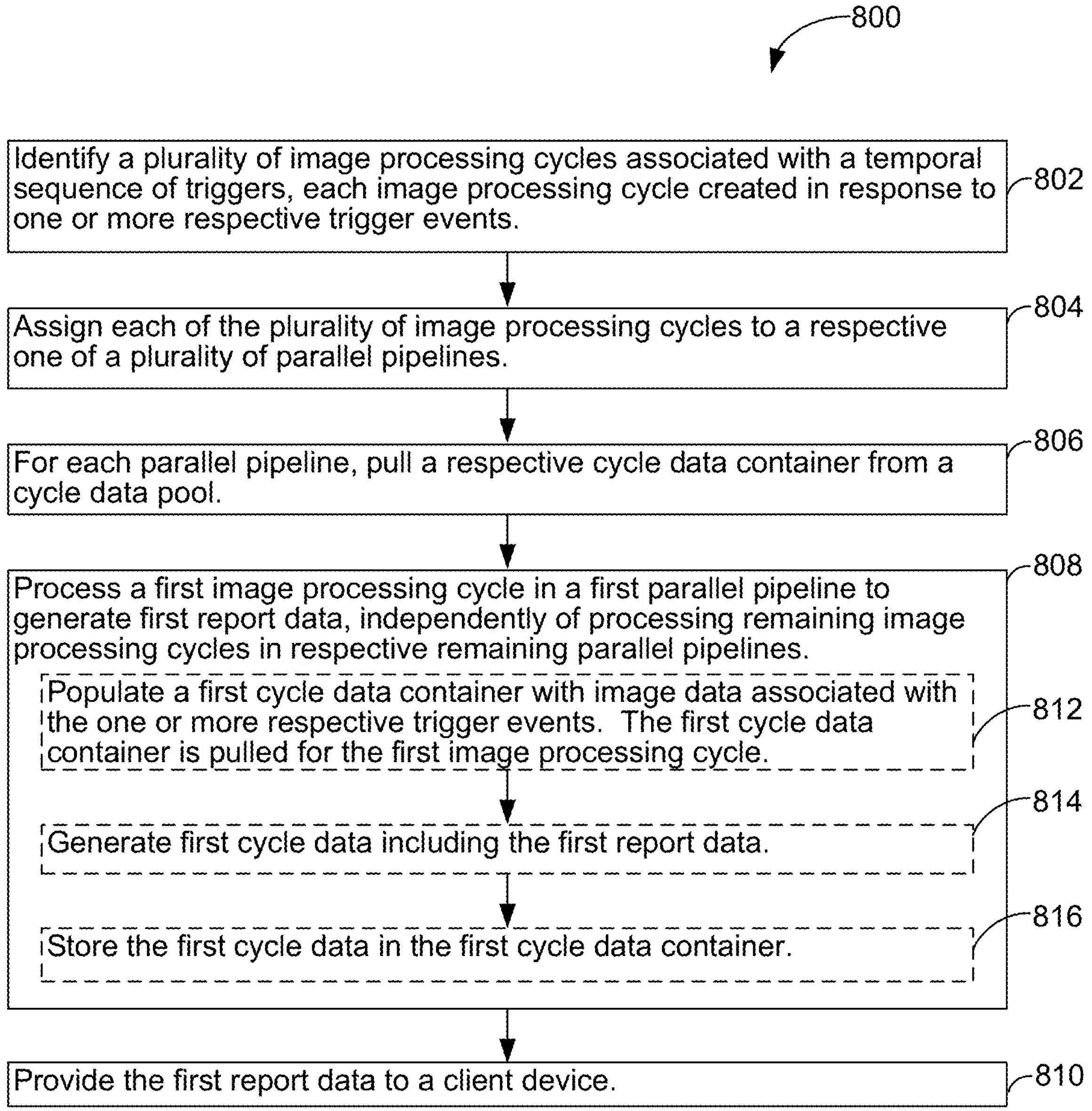
FIG. 8 is a flow diagram of a method for processing image data, in accordance with some embodiments.

FIG. 8 is a flow diagram of a method 800 for processing image data, in accordance with some embodiments. The method is implemented by an electronic device 100, particularly by an image acquisition and processing module 240 of the electronic device 100. In some embodiments, the electronic device 100 includes one or more cameras 112 configured to capture images. In some embodiments, the electronic device 100 is coupled to a camera or a distinct electronic device having a camera, and configured to acquire image data including a sequence of images.

The electronic device 100 identifies (802) a plurality of image processing cycles 404 associated with a temporal sequence of triggers 602. Each image processing cycle 404 is created in response to one or more respective trigger events. Each trigger event includes acquisition of a respective image. The electronic device 100 assigns (804) the plurality of image processing cycles 404 to a plurality of parallel pipelines 402. For each parallel pipeline 402, a respective cycle data container 406 is pulled (806) from a cycle data pool 408. The electronic device 100 processes (808) a first image processing cycle 404A in a first parallel pipeline 402A to generate first report data, independently of processing remaining image processing cycles 404 (e.g., 404B and 404C in FIG. 4) in respective remaining parallel pipelines 402. The first report data is provided (810) to a client device 302 (e.g., 302A in FIG. 3), e.g., for display on a web-based user interface of the client device 302.

In some embodiments, a trigger event includes acquisition of a single image, and the single image is processed in a corresponding image processing cycle 404. Alternatively, in some embodiments, a plurality of trigger events includes acquisition of a plurality of images, and in response to the plurality of trigger events, an image processing cycle 404 is executed to process the plurality of images associated with the plurality of trigger events. In the first processing cycle 404A, the plurality of trigger events is processed by a plurality of threads. In some situations, a first thread 612A (FIG. 6) generates a first subset of first cycle data 414A to be applied by a second thread 612. The second thread 612 is initiated, and suspended to wait until the first subset of the first cycle data 414A is generated and made available by the first thread.

In some embodiments, the cycle data pool 408 includes a predefined number of cycle data containers 406 prior to identifying the plurality of image processing cycles 404. Once assigned to a respective image processing cycle 404, each parallel pipeline 402 directly uses one of the predefined number of cycle data containers 406 without waiting for creation of the cycle data container 406. This expedites initiation and execution of each parallel pipeline 402. In some situations, the predefined number of cycle data containers is fully used with different pipelines 402, and no cycle data container 406 can be pulled for a pipeline 402 assigned with a new image processing cycle 404.

In some embodiments, processing the first image processing cycle 404A further includes populating (812) a first cycle data container 406A with image data associated with the one or more respective trigger events associated with the first image processing cycle 404A, generating (814) first cycle data 414A including the first report data 312A, and storing (816) the first cycle data 414A in the first cycle data container 406A. In some embodiments, after the first image processing cycle 404A is completed, data stored in the first cycle data container 406A is purged, and the first cycle data container 406A is returned to the cycle data pool 408, waiting to be pulled and used with a next parallel pipeline 402. In some embodiments, the report data 312A reported to the client device 302 for the first image processing cycle 404A includes all of the first cycle data 414A and the image data. The first cycle data includes all intermediate or final data generated by the first parallel pipeline 402A. The client device 302 stores the report data 312 in a database (e.g., in storage 306), visualizes the report data 312, controls the report data 312, and the like.

In some embodiments, the first image processing cycle 404A includes a first thread 612A and a second thread 612B. The first image processing cycle 404A is processed in the first parallel pipeline 402A by sequentially generating a first subset of the first cycle data by the first thread 612A, initiating the second thread 612B before generation of the first subset of the first cycle data, and suspending the second thread 612B to wait until the first subset of the first cycle data is generated by the first thread 612A.

In an example, the first image processing cycle 404A is created in response to a first trigger event. The first trigger event includes acquisition of an image including a bar code. The first cycle data includes a serial number corresponding to the bar code. The first report data includes a product name and a price of a product. In another example, the first image processing cycle 404A is created in response to a first trigger event. The first trigger event includes acquisition of an image of a label attached to a drug bottle. in some embodiments, the first report data includes the image of the label. The client device 302 receives the image of the label, determines that the label in the image is damaged, and displays the image of the label with a message indicating that the label on the drug bottle is damaged. Alternatively, in some embodiments, the electronic device 100 determines that the label in the image is damaged and generates the first report data 312A including the message indicating that the label on the drug bottle is damaged. The client device 302 receives the message and displays the message without the image of the label.

In some embodiments, the first cycle data 312A includes intermediate data that is generated by, and passed among, a plurality of stages of the first image processing cycle 404A and used to generate the first report data, and a plurality of data items of the intermediate data forms a queue and is stored in in the first cycle data container 406A successively.

In some embodiments, the temporal sequence of triggers corresponds to an ordered sequence of images processed during the plurality of image processing cycles 404 assigned to the plurality of parallel pipelines 402. A first image is acquired prior to a second image, and report data 312 corresponding to the first image is provided to the client device prior to report data 312 corresponding to the second image.

In some embodiments, the first image processing cycle 404A is created in response to a plurality of trigger events, and each of the plurality of trigger events includes acquisition of a respective image. In some situations, while waiting a later trigger event, the pipeline 402 starts processing of an earlier trigger event in the first image processing cycle 404A.

In some embodiments, the first image processing cycle 404A includes a first stage 610A and a second stage 610B (FIG. 6). The first image processing cycle 404A in the first parallel pipeline 402A is processed by implementing part of the first stage 610A and part of the second stage 610B in parallel.

In some embodiments, the first image processing cycle 404A includes a sequence of stages (e.g., 506-512 in FIG. 5). The first image processing cycle 404A is processed in the first parallel pipeline 402A by successively implementing each of the sequence of stages using first hardware resources allocated to the first parallel pipeline 402A.

In some embodiments, subsequently to the first image processing cycle 404A, the electronic device processes a second image processing cycle 404A distinct from the plurality of image processing cycles 404 in a second parallel pipeline 402B. After providing the first report data 312A to the client device, the electronic device 100 provides second report data to the client device 302. In some embodiments, the second report data is visualized on a user interface of the client device 302. In some embodiments, a first trigger event of a first image processing cycle 404A precedes a second trigger event of a second image processing cycle 404B. Second report data 312B of the second image processing cycle 404B is provided to the client device 302 after first report data 312A of the first image processing cycle 404A, independently of whether the second report data 312B is available before or after the first report data 312A. Alternatively, in some embodiments, independently of a temporal order of the first and second trigger events, whichever one of the first and second report data 312A and 312B is available first is reported to the client device 302 first. If the second report data 312B of the second image processing cycle 404B is available before the first report data 312A of the first image processing cycle 404A, the second report data 312B is provided to the client device 302 before the first report data 312A. If the second report data 312B is available after the first report data 312A, the second report data 312B is provided to the client device 302 after the first report data 312A.

In some embodiments, the first image processing cycle 404A is implemented in the first parallel pipeline 402A by loading a workflow template on the first parallel pipeline 402A and in accordance with the workflow template, implementing a plurality of stages of the first image processing cycle 404A without being interrupted by the remaining image processing cycles 404.

In some embodiments, the electronic device 100 monitors central processing unit (CPU) core utilization. Dynamically based on the CPU core utilization, respective computational resources allocated to the plurality of parallel pipelines 402 are adjusted. This is implemented automatically and without user intervention. High precision instrumentation is built in, allowing a deep and intuitive understanding of the effects of adjusting the various performance parameters, including the loading of threads, processes, and cores, and hardware utilization. In some embodiments, computer performance is visualized in a user interface of the client device 302. Computer performance is analyzed in real time during execution, with the potential for auto-adjusting parameters that enhances performance without user intervention.

In some embodiments, the plurality of image processing cycles 404 includes a plurality of first image processing cycles 404-1 (FIGS. 5 and 6). While processing the plurality of first image processing cycles 404-1 in the plurality of parallel pipelines 402, the electronic device 100 dynamically adjusts one or more parameters of: a number of pipelines, a size of thread pools, thread priorities, delays, throttling parameters, core assignments, acquisition parameters, lighting, and camera focus. A plurality of second image processing cycles 404-2 follows the plurality of first image processing cycles 404-1. The electronic device assigns the plurality of second image processing cycles 404 to the plurality of parallel pipelines 402. Based on the one or more adjusted parameters, the plurality of second image processing cycles 404-2 is processed in the plurality of parallel pipelines 402.

In some embodiments, the client device 302 executes an interactive user application. The electronic device 200 enables display of a user interface, and displays the first report data on the user interface of the client device 302. Further, in some embodiments, the user application is driven by a first program language, and the plurality of image processing cycles 404 are executed by a second program language distinct from the first program language, wherein the plurality of image processing cycles 404 is configured to exchange instructions and data with the user application automatically via an intermediate data representation between the first and second program languages. In some embodiments, the interactive user application is locally implemented on the client device 302, which is coupled to the electronic device via a wired communication link or a local communication network. In some embodiments, the interactive user application is web-based and implemented on the client device 302, which is coupled to the electronic device via a WAN (e.g., the Internet). For example, a web-based user interface is enabled in a browser-based application, which is served directly from the client device 302 and communicates with the electronic device 100 using HTTP and web sockets. The user interface is enabled for defining, setting up, adjusting, and debugging the electronic device 100 and its associated workflows and jobs.

In some embodiments, the first image processing cycle 404A is implemented on an electronic device 100, which is coupled to the client device via a local communication network.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 206 stores a subset of the modules and data structures identified above. Furthermore, the memory 206 may store additional modules or data structures not described above.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and "comprising," when used in this specification, specify the presence of stated features, steps, operations, elements, and/or components, but do not preclude the presence or addition of one or more other features, steps, operations, elements, components, and/or groups thereof.

As used herein, the phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or embodiments.

As used herein, the term "and/or" encompasses any combination of listed elements. For example, "A, B, and/or C" includes the following sets of elements: A only, B only, C only, A and B without C, A and C without B, B and C without A, or a combination of all three elements, A, B, and C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An image processing method implemented at an electronic device having memory and one or more processors, the method comprising:

identifying a plurality of image processing cycles associated with a temporal sequence of triggers, each image processing cycle created in response to one or more respective trigger events;

assigning the plurality of image processing cycles to a plurality of parallel pipelines;

for each parallel pipeline, pulling a respective cycle data container from a cycle data pool, without waiting for creation of a new cycle data container, the cycle data pool including a predefined number of cycle data containers;

processing a first image processing cycle in a first parallel pipeline to generate first report data, independently of processing remaining image processing cycles in respective remaining parallel pipelines;

providing the first report data to a client device, and returning the cycle data container to the cycle data pool.

2. The method of claim 1, wherein processing the first image processing cycle further comprises:

populating a first cycle data container with image data associated with the one or more respective trigger events, wherein the first cycle data container is pulled for the first image processing cycle;

generating first cycle data including the first report data; and storing the first cycle data in the first cycle data container.

3. The method of claim 2, wherein the first image processing cycle includes a first thread and a second thread, and processing the first image processing cycle in the first parallel pipeline further comprises, sequentially: s generating a first subset of the first cycle data by the first thread;

initiating the second thread before generation of the first subset of the first cycle data; and suspending the second thread to wait until the first subset of the first cycle data is generated by the first thread.

4. The method of claim 2, wherein:

the first image processing cycle is created in response to a first trigger event;

the first trigger event includes acquisition of an image including a bar code;

the first cycle data includes a serial number corresponding to the bar code; and the first report data includes a product name and a price of a product.

5. The method of claim 2, wherein the first cycle data includes intermediate data that is generated by, and passed among, a plurality of stages of the first image processing cycle and used to generate the first report data, and a plurality of data items of the intermediate data forms a queue and is stored in in the first cycle data container successively.

6. The method of claim 1, wherein the first image processing cycle is created in response to a plurality of trigger events, and each of the plurality of trigger events includes acquisition of a respective image.

7. The method of claim 1, wherein the first image processing cycle includes a first stage and a second stage, and processing the first image processing cycle in the first parallel pipeline further comprises:

implementing part of the first stage and part of the second stage in parallel.

8. The method of claim 1, wherein the first image processing cycle includes a sequence of stages, and processing the first image processing cycle in the first parallel pipeline further comprises:

successively implementing each of the sequence of stages using first hardware resources allocated to the first parallel pipeline.

9. The method of claim 1, further comprising:

subsequently to the first image processing cycle, processing a second image processing cycle distinct from the plurality of image processing cycles in a second parallel pipeline; and after providing the first report data to the client device, providing second report data to the client device.

10. The method of claim 1, wherein processing the first image processing cycle in the first parallel pipeline further comprises:

loading a workflow template on the first parallel pipeline; and in accordance with the workflow template, implementing a plurality of stages of the first image processing cycle without being interrupted by the remaining image processing cycles.

11. An electronic system, comprising:

one or more processors; and memory storing one or more programs configured to be executed by the processors, the one or more programs further comprising instructions for:

identifying a plurality of image processing cycles associated with a temporal sequence of triggers, each image processing cycle created in response to one or more respective trigger events;

assigning the plurality of image processing cycles to a plurality of parallel pipelines;

for each parallel pipeline, pulling a respective cycle data container from a cycle data pool, without waiting for creation of a new cycle data container, the cycle data pool including a predefined number of cycle data containers;

processing a first image processing cycle in a first parallel pipeline to generate first report data, independently of processing remaining image processing cycles in respective remaining parallel pipelines;

providing the first report data to a client device, and returning the cycle data container to the cycle data pool.

12. The electronic system of claim 11, the one or more programs further comprising instructions for:

monitoring central processing unit (CPU) core utilization; and dynamically based on the CPU core utilization, adjusting respective computational resources allocated to the plurality of parallel pipelines.

13. The electronic system of claim 11, wherein the plurality of image processing cycles includes a plurality of first image processing cycles, the one or more programs further comprising instructions for:

while processing the plurality of first image processing cycles in the plurality of parallel pipelines, dynamically adjusting one or more parameters of: a number of pipelines, a size of thread pools, thread priorities, delays, throttling parameters, core assignments, acquisition parameters, lighting, and camera focus;

assigning a plurality of second image processing cycles following the plurality of first image processing cycles to the plurality of parallel pipelines; and based on the one or more adjusted parameters, processing the plurality of second image processing cycles in the plurality of parallel pipelines.

14. The electronic system of claim 11, the one or more programs further comprising instructions for:

executing an interactive user application on the client device, including enabling display of a user interface on the client device, and displaying the first report data on the user interface of the client device.

15. The electronic system of claim 11, the one or more programs comprising instructions for:

executing a user application on the client device, wherein the user application is driven by a first program language, and the plurality of image processing cycles are executed by a second program language distinct from the first program language, and wherein the plurality of image processing cycles is configured to exchange instructions and data with the user application automatically via an intermediate data representation between the first and second program languages.

16. A non-transitory computer-readable storage medium storing one or more programs for execution by one or more processors of an electronic system, the one or more programs comprising instructions for:

identifying a plurality of image processing cycles associated with a temporal sequence of triggers, each image processing cycle created in response to one or more respective trigger events;

assigning the plurality of image processing cycles to a plurality of parallel pipelines;

for each parallel pipeline, pulling a respective cycle data container from a cycle data pool, without waiting for creation of a new cycle data container, the cycle data pool including a predefined number of cycle data containers;

processing a first image processing cycle in a first parallel pipeline to generate first report data, independently of processing remaining image processing cycles in respective remaining parallel pipelines;

providing the first report data to a client device, and returning the cycle data container to the cycle data pool.

17. The non-transitory computer-readable storage medium of claim 16, wherein the first image processing cycle is implemented on an electronic device, which is coupled to the client device via a local communication network.

18. The non-transitory computer-readable storage medium of claim 16, wherein processing the first image processing cycle further comprises:

populating a first cycle data container with image data associated with the one or more respective trigger events, wherein the first cycle data container is pulled for the first image processing cycle;

generating first cycle data including the first report data; and storing the first cycle data in the first cycle data container.

19. The non-transitory computer-readable storage medium of claim 16, the one or more programs further comprising instructions for:

while processing the plurality of image processing cycles in the plurality of parallel pipelines, dynamically adjusting one or more parameters of: a number of pipelines, a size of thread pools, thread priorities, delays, throttling parameters, core assignments, acquisition parameters, lighting, and camera focus.

20. The non-transitory computer-readable storage medium of claim 19, wherein the plurality of image processing cycles includes a plurality of first image processing cycles, the one or more programs further comprising instructions for:

assigning a plurality of second image processing cycles following the plurality of first image processing cycles to the plurality of parallel pipelines; and based on the one or more adjusted parameters, processing the plurality of second image processing cycles in the plurality of parallel pipelines.

* * * * *